(12) United States Patent
Saw

(10) Patent No.: US 7,522,665 B2
(45) Date of Patent: Apr. 21, 2009

(54) MOBILE TERMINAL WITH CAMERA

(75) Inventor: Yoo-Sok Saw, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 696 days.

(21) Appl. No.: 10/610,868

(22) Filed: Jul. 2, 2003

(65) Prior Publication Data
US 2004/0005002 A1   Jan. 8, 2004

(30) Foreign Application Priority Data
Jul. 4, 2002   (KR) ..................... 10-2002-0038707

(51) Int. Cl.
*H04N 7/12* (2006.01)
*H04N 11/02* (2006.01)
*H04N 11/04* (2006.01)
*H04B 1/66* (2006.01)

(52) U.S. Cl. .............................................. 375/240.03

(58) Field of Classification Search .................. 375/240.01–240.29; 370/522; *H04N 7/12*
See application file for complete search history.

(56) References Cited

U.S. PATENT DOCUMENTS

| | | | | |
|---|---|---|---|---|
| 4,617,676 | A * | 10/1986 | Jayant et al. .................. | 704/212 |
| 5,138,447 | A * | 8/1992 | Shen et al. ............. | 375/240.12 |
| 5,481,297 | A * | 1/1996 | Cash et al. ............. | 375/240.01 |
| 5,598,213 | A * | 1/1997 | Chung et al. ........... | 375/240.04 |
| 5,650,782 | A * | 7/1997 | Kim ........................... | 341/67 |
| 5,691,768 | A * | 11/1997 | Civanlar et al. ........ | 375/240.01 |
| 6,104,751 | A * | 8/2000 | Artieri .................... | 375/240.14 |
| 6,310,897 | B1 * | 10/2001 | Watanabe et al. ........... | 370/522 |
| 6,570,921 | B1 * | 5/2003 | Bailleul et al. ......... | 375/240.07 |
| 6,683,910 | B1 * | 1/2004 | Burns et al. ............ | 375/240.24 |
| 6,763,068 | B2 * | 7/2004 | Oktem ................... | 375/240.03 |
| 6,816,550 | B2 * | 11/2004 | Kumaki ................. | 375/240.03 |
| 7,054,362 | B1 * | 5/2006 | Shen et al. .............. | 375/240.02 |
| 7,072,366 | B2 * | 7/2006 | Parkkinen et al. ........... | 370/538 |
| 2002/0064228 | A1 * | 5/2002 | Sethuraman et al. ... | 375/240.12 |
| 2002/0085635 | A1 * | 7/2002 | Kim et al. .............. | 375/240.05 |
| 2003/0012286 | A1 * | 1/2003 | Ishtiaq et al. .......... | 375/240.24 |

FOREIGN PATENT DOCUMENTS

| | | |
|---|---|---|
| CN | 1200223 | 11/1998 |
| EP | 0860999 A1 | 8/1998 |

(Continued)

OTHER PUBLICATIONS

International Organization for Standardization: "Test Model 5," ISO-IEC/JTC1/SC29/WG11/N0400, Coded Representation of Picture and Audio Information, Document AVC-491B, Version 2: Apr. 1993, Geneva, ISO, CH, pp. 1-119.

*Primary Examiner*—Nhon T Diep
(74) *Attorney, Agent, or Firm*—KED & Associates, LLP

(57) ABSTRACT

A video encoding/decoding apparatus includes an encoding unit which processes video data to be transmitted in unit of slice, a multiplexer/demultiplexer which multiplexes the video data from the encoding unit and de-multiplexes video data received through a communication channel, a decoding unit which processes video data from the multiplexer/demultiplexer in unit of slice. The video information delay is reduced less than or equal to the audio information delay such that there is no need for additional memory to delay the audio information so as to synchronize with the video information.

20 Claims, 3 Drawing Sheets

FOREIGN PATENT DOCUMENTS

| | | |
|---|---|---|
| JP | 7115651 | 5/1995 |
| JP | 10-234043 | 9/1998 |
| JP | 2000134617 | 5/2000 |
| JP | 2000224589 | 8/2000 |
| JP | 2001285861 | 10/2001 |
| WO | WO 00/21302 | 4/2000 |
| WO | WO 02/25951 A2 | 3/2002 |

* cited by examiner

MOBILE TERMINAL WITH CAMERA

BACKGROUND OF THE INVENTION

1. Field of the Invention

The present invention relates to a multimedia communication terminal and, more particularly, to an improved video encoding/decoding apparatus and method for the multimedia communication terminal.

2. Background of the Related Art

Recently, the development and commercialization of IMT-2000 services multimedia handsets for simultaneously transmitting audio and video information through wired or wireless channels has increased.

In a multiplexed transmission system, the audio and video information should be encoded to maintain balance of the audio and video information. However, video information occupies a large amount of the whole data set to be transmitted, in comparison with audio information. Typically, the audio and video information is separately coded and transmitted through separate channels. Also, there is a method using one transmission channel for both the audio and video information. In this case, the encoding/decoding algorithm becomes complex for calculating the video information delay time which is used to synchronize the audio and video information.

Generally, the end-to-end delay of the video information in multimedia communication is 200~400 ms (total allowable delay is 400 ms in H.324 and 3G-324

Generally, the end-to-end delay of the video information in multimedia communication is 200~400 ms (total allowable delay is 400 ms in H.324 and 3G-324 standards). This delay time causes the video to appear choppy and also is much greater than that of the audio information, which is 30~60 ms. The delay difference between the video information and the audio information contributes to the degradation of the multimedia communication quality. Accordingly, to synchronize the video information with the audio information, the audio information should be delayed as much as the delay difference between the audio and video information. In order to delay the audio information as much as the delay difference, a memory buffer is required for temporary storing the audio information, and the greater the delay difference is, the greater the memory buffer size required. The total delay can be divided into a propagation delay and a processing delay caused at the codec. However, since the delay caused by the channel is relatively stationary, it is critical to reduce the processing delay caused at the codec.

In the related art video codec, which may be implemented in hardware as well as software, the video information delay includes a processing delay of about 200~400 ms. Even though these delay levels satisfy the H.321 and the 3G-324 standard recommendations, choppy movement on the motion picture caused by the delay makes users feel uncomfortable and adversely affects picture quality. Also, since the difference between the video and audio delays is great and varies, it is difficult to precisely synchronize the audio information with the video information.

Furthermore, in the related art codec, since the audio information should be stored so as to be synchronized with the video information which is much delayed, the need for additional memory resources for storing the audio information is an inevitable design consequence.

SUMMARY OF THE INVENTION

The present invention solves many of the disadvantages associated with the related art. It is an object of the present invention to provide a video encoding/decoding apparatus and method capable of enhancing multimedia communication quality by minimizing the processing delay caused at the video codec of a multimedia communication terminal.

It is another object of the present invention to provide a video encoding/decoding apparatus and method capable of minimizing usage of memory and memory management complexity by reducing a delay difference between the video and audio information in a multimedia communication terminal.

It is still another object of the present invention to provide a video encoding/decoding apparatus and method capable of precisely synchronizing the audio information to the video information by reducing the delay of the video information equal to or less than the audio information delay.

To achieve the above object, the video encoding/decoding apparatus of the present invention comprises an encoding unit which processes video data to be transmitted in unit of slice, a multiplexer/demultiplexer which multiplexes the video data from the encoding unit and de-multiplexes video data received through a communication channel, a decoding unit which processes video data from the multiplexer/demultiplexer in unit of slice.

The encoding unit comprises a first plurality of slice memories that temporally store the video data inputted from a camera in unit of slice, a video encoder which encodes the video data from respective first slice memories in unit of slice, a quantizer which quantizes the video data from the video encoder, a first macro block buffer which temporally stores the video data from the quantizer in unit of macro block before sending the video data to the multiplexer/demultiplexer.

The encoding unit further comprises a first inverse quantizer to which output of the first macro block buffer is inputted and of which output is sent to the video encoder.

The encoding unit further comprises a quantization controller which controls input of the first macro block buffer according to the output of the macro block buffer.

The quantization controller monitors the output of the first macro block buffer and determines whether transmission bits of the output is greater than or less than a predetermined value.

The quantization controller controls the quantizer in order for the output of the quantizer to decrease when the output transmission bits of the first macro block buffer is greater than the predetermined value and in order for the output of the quantizer to increase when the output transmission bits of the first macro block buffer is less than the predetermined value.

The quantization controller controls the quantizer so as to insert stuffing bits to the output of the first macro block buffer when the transmission bits are very small.

The decoding unit comprises a second macro block buffer which temporally store the video data demultiplexed at the multiplexer/demultiplexer, a second inverse quantizer which inversely quantizes from the second macro block buffer, a video decoder which decodes the video data from the inverse quantizer, and a plurality of second slice memories which temporally store the video data from the video decoder and transmits the video data to a display in unit of slice.

To achieve the above object, the video encoding/decoding method of the present invention comprises: processing video data inputted from a camera in unit of slice; transmitting the video data processed in unit of slice through a communication channel; receiving video data through the communication channel; and processing the received video data in unit of slice.

The input video data processing includes: temporally storing the input video data in parallel in unit of slice; encoding the video data stored in parallel in a predetermined order; quantizing the encoded video data; temporally storing the quantized video data; and multiplexing the temporally stored video data in unit of macro block together with audio and control signals.

The input video data processing further includes inversely quantizing the video data stored in unit of macro block and reflecting the inversely quantized video data to the video data encoding.

The input video data processing further includes monitoring the number of bits of the video data stored in unit of macro block and controlling quantization according to the number of bits.

The quantization controlling includes determining whether the number of bits of the video data stored in unit of macro block is greater than or less than a predetermined value, decreasing quantization amount when the number of bits of the video data stored in unit of macro block is greater than the predetermined value, and increasing quantization amount when the number of bits of the video data stored in unit of macro block is less than the predetermined value.

The quantization controlling further includes inserting stuffing bits when the number of bits of the video data stored in unit of macro block is very small in comparison with the predetermined value.

The received video data processing includes demultiplexing the received video data, temporally storing the video data in unit of macro block, inversely quantizing the video data stored in unit of macro block, decoding the inversely quantized video data in unit of slice, temporally storing the decoded video data in parallel in unit of slice, and transmitting the video data to a display in a predetermined order.

In another embodiment of the present invention, the video encoding/decoding apparatus for a communication terminal includes a first data processing unit which processes data in unit of a slice. A second data processing unit which multiplexes the data from the first data processing unit and demultiplexes data received through a communication channel. A third data processing unit processes data from the second processing unit in unit of slice.

The first data processing unit is an encoding unit, the second data processing unit is a multiplexer/demultiplexer, and the third data processing unit is a decoding unit. The first, second and third data processing units reside in at least one processor, and one type of the data processed is video data.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
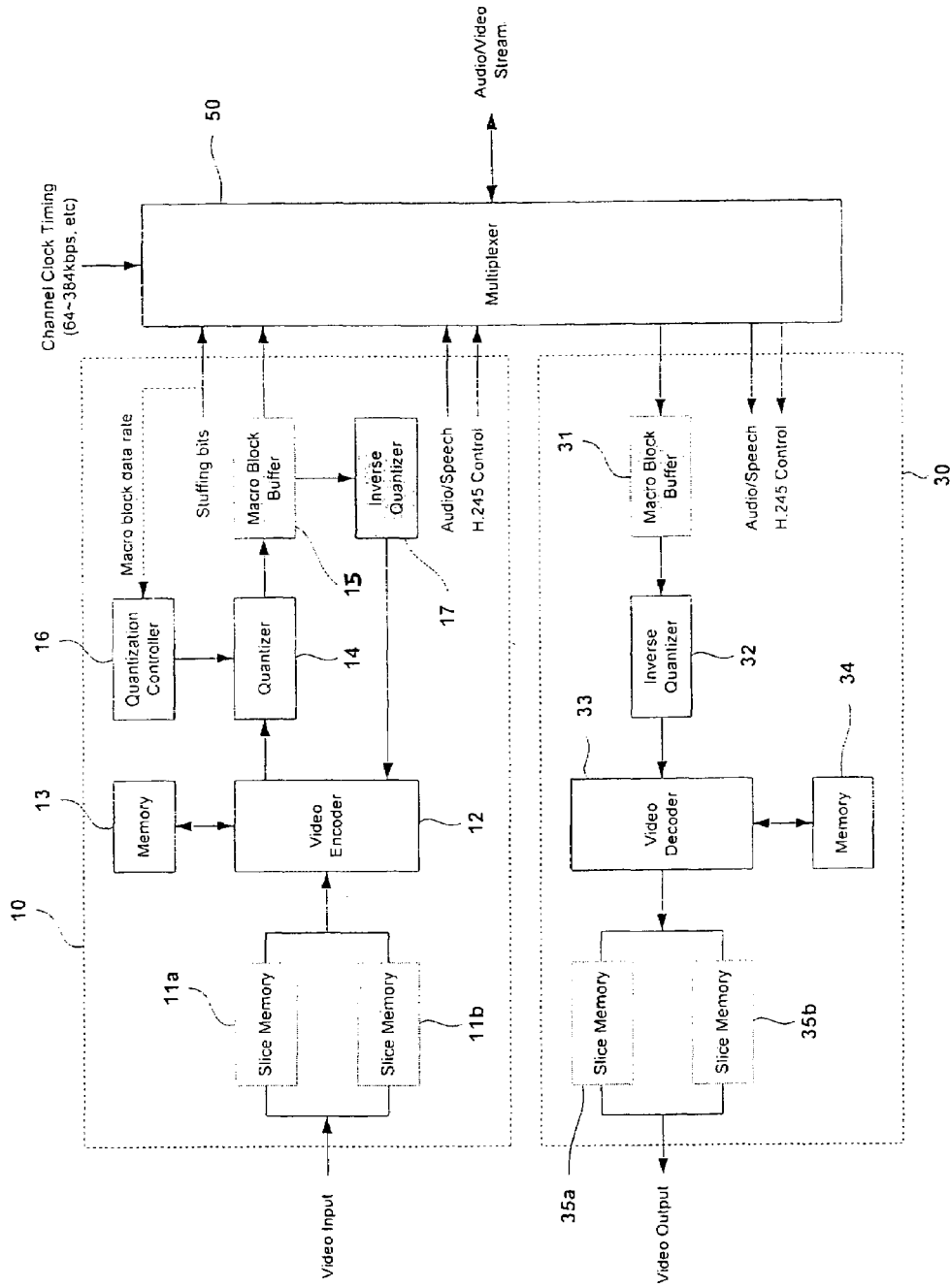
FIG. 1 is a block diagram illustrating an exemplary video encoding/decoding apparatus according to a preferred embodiment of the present invention.

In the video encoding/decoding apparatus of the claimed invention, the video data is processed in unit of slice rather than the frame so as to reduce the processing time of the video data. FIG. 1 is a block diagram showing the video encoding/decoding apparatus according to the preferred embodiment of the present invention. As shown in FIG. 1, the video encoding/decoding apparatus includes a video encoding unit 10 for encoding video input from a camera (not shown), a multiplexer/demultiplexer 50 for multiplexing video data processed in the video encoding unit 10 and transmitting the video data through a physical channel (e.g., the form of a bit stream), and a video decoding unit 30 for decoding received video data through the physical channel after having been demultiplexed by the multiplexer/demultiplexer 50.

The video encoding unit 10 includes a plurality of first slice memories 11a and 11b connected to a camera (not shown) in parallel with each other. A video encoder 12 is connected to the first slice memories 11a and 11b. A first frame memory 13 is connected to the video encoder 12 for temporally storing video data processed in the video encoder 12 in unit of frame. A quantizer 14 for quantizing the video data from the video encoder 12, a first macro block buffer 15 for storing the video data quantized at the quantizer 14 in unit of macro block, a quantization controller 16 for controlling the quantizer 14, and a first inverse quantizer 17 for receiving the output of the first macro block buffer 15 and inversely quantizing the output of the first macro block buffer 15 so as to provide the inversely quantized data to the video encoder 12.

In this exemplary embodiment, since the first slice memories 11a and 11b are connected between the camera and the video encoder 12 in parallel, the video data outputted from the camera are simultaneously inputted to the first slice memories 11a and 11b respectively and processed by the video encoder 12 in the unit of slice.

The first inverse quantizer 17 receives and inversely quantizes the output of the first macro block buffer 15, such that the inversely quantized video data is provided to the video encoder 12. The inversely quantized video data is processed by the video encoder 12 and then reflected to video data stored in the first frame memory 13.

The quantization controller 16 monitors the output of the macro block buffer 15 to adjust the data amount stored in the macro block buffer 15 by comparing the monitored output with an average number of transmission bits (M_bits) per macro block, which is determined according to the transmission channel rate of the multiplexer/demultiplexer 50. The quantization controller 16 controls the quantizer 14 so as to reduce input data of the macro block buffer 15 if the output bits of the macro block buffer 15 are greater than the average number of transmission bits (M_bits) and to increase the input data of the macro block buffer 15 if the output bits of the macro block buffer 15 is less than the average number of transmission bits (M_bits). In the case where the output bits of the macro block buffer 15 are small, the quantization controller 16 controls the quantizer 14 so as to insert stuffing bits to the output of the macro block buffer 15.

The video data outputted from the macro block buffer 15 are multiplexed with the audio including speech, and H.245 control signals at the multiplexer/demultiplexer 50 and then transmitted through a physical channel and/or to the decoding unit 30 without multiplexing.

The video decoding unit 30 includes a second macro block buffer 31 for storing video data demultiplexed at the multiplexer/demultiplexer 50. A second inverse quantizer 32 inversely quantizes the video data from the second macro block buffer 31, a video decoder 33 decoding the video data from the second inverse quantizer 32, a second frame memory 34 for temporally storing decoded video data in unit of frame, and a plurality of second slice memories 35a and 35b for storing the video data decoded at the video decoder 33 and feeding the video data to a display unit (not shown).

The second macro block buffer 31 temporally stores, in the unit of a macro block, the video data demultiplexed at the multiplexer/demultiplexer 50 in the same manner of the video encoding unit 10 and provides the video data to the second inverse quantizer 32.

The video decoder 33 feeds the video data inversely quantized at the second inverse quantizer 32 to the second slice memories 35a and 35b such that the video data stored in the respective second slice memories 35a and 35b are simultaneously fed to the display (not shown) in parallel.

Figure 2:
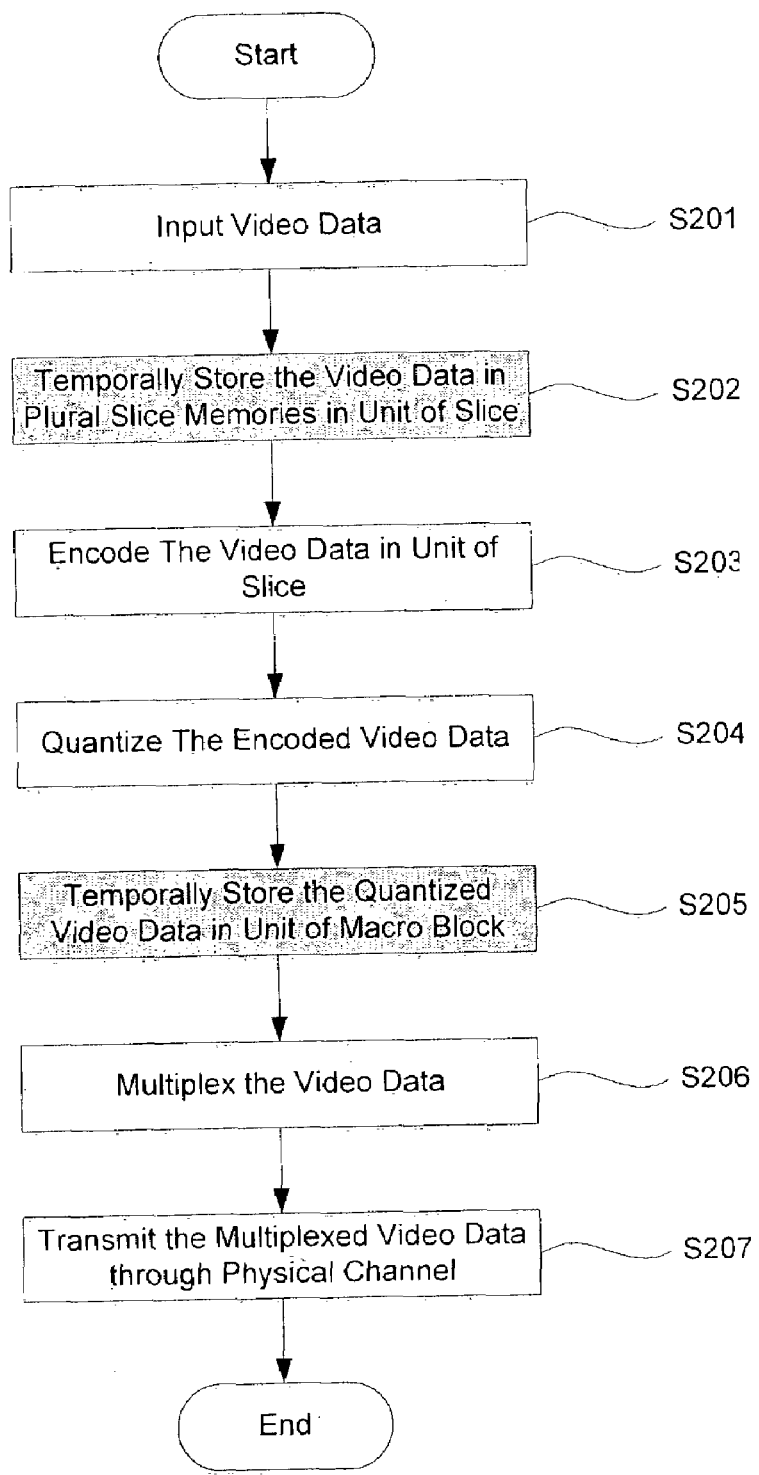
FIG. 2 is a flowchart illustrating an exemplary video data encoding procedure of a video coding/decoding method according to a preferred embodiment of the present invention.

The operation of the above structured exemplary video encoding/decoding apparatus will be described hereinafter. FIG. 2 is a flowchart illustrating video data encoding procedure of the video data encoding/decoding method of the present invention. As shown in FIG. 2, once the video data is inputted from the camera (not shown) at step S201, the video data is stored in the slice memories 11a and 11b in unit of slice at step S202 and then are fed to the video encoder 12. The video data is appropriately processed at the video encoder 12 at step S203 and then transferred to the quantizer 14 so as to be quantized under control of the quantization controller 16 at step S204. The quantized video data is temporally stored in the macro block buffer 15 at step S205 and transferred to the multiplexer/demultiplexer 50 and the inverse quantizer 17 in unit of macro block.

The video data transferred to the multiplexer/demultiplexer 50 is multiplexed together with the audio including speech and H.245 control signals at step S206 and then transmitted through the physical channel in the form of bit stream at step S207.

Also, the video data transferred to the inverse quantizer 17 is inversely quantized and then sent to the video encoder 12, such that the inversely quantized video data is processed by the video encoder 12 and then reflected to the video data stored in the first frame memory 13.

Figure 3:
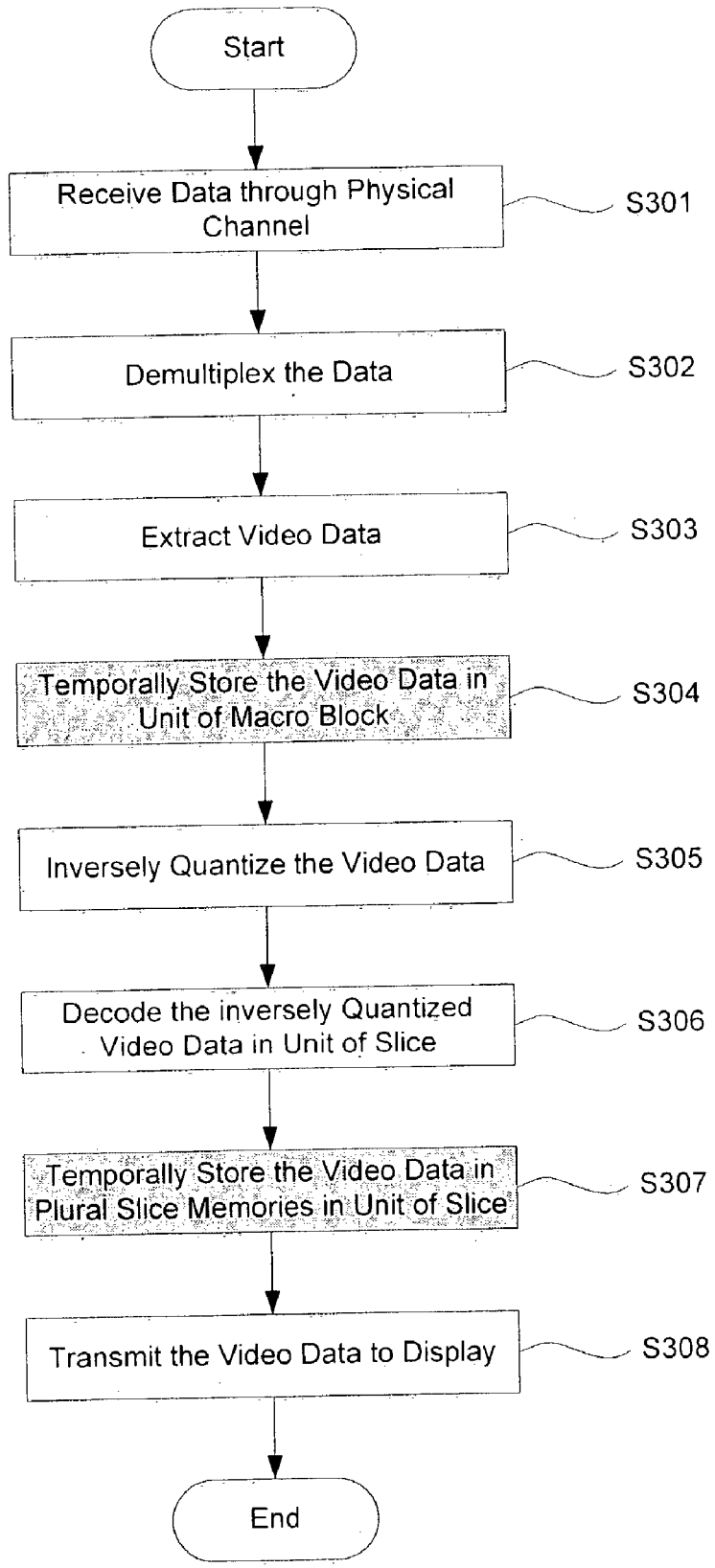
FIG. 3 is a flowchart illustrating an exemplary video data decoding procedure of the video coding/decoding method according to a preferred embodiment of the present invention.

FIG. 3 is a flowchart illustrating an exemplary video data decoding procedure of the video encoding/decoding method of the present invention. As shown in FIG. 3, if the data is received through the physical channel at step S301, the data is demultiplexed by the multiplexer/demultiplexer 50 at step S302 and the video data is extracted from the data at step S303. The extracted video data is temporally stored in the second macro block buffer 31 in unit of macro block at step S304 and then sent to the second inverse quantizer 32 so as to be inversely quantized at step S305. The inversely quantized video data is sent to the video decoder 33 so as to be decoded at step S306 and then the decoded video data is temporally stored in the plural second slice memories 35a and 35b in unit of slice at step S307. Consequently, the video data stored in the plural slice memories 35a and 35b is fed to the display (not shown) in parallel at step S308.

As described above, the video encoding/decoding apparatus according to the preferred embodiment of the present invention processes the video data in unit of slice, such that the processing delays caused at both the coder and decoder are reduced. Accordingly, the movements on the video are smooth even when the video data is received through a communication channel.

Also, since the video data is processed in unit of slice in the video encoding/decoding apparatus, it is possible to reduce the memory size using several slice memories rather than the larger frame memory required for a picture frame. Furthermore, in the video encoding/decoding apparatus of the present invention the video information delay is reduced less than or equal to the audio information delay such that there is no need additional memory for synchronizing the audio information with the video information.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A video encoding/decoding apparatus for a communication terminal comprising:
   an encoding unit that processes video data to be transmitted in unit of slice;
   a multiplexer/demultiplexer that multiplexes the data from the encoding unit and that demultiplexes video data received through a communication channel; and
   a decoding unit that processes video data from the multiplexer/demultiplexer in unit of slice,
   wherein the encoding unit comprises:
      a first plurality of slice memories that temporarily store the video data inputted from an image input device in unit of slice;
      a video encoder that encodes the video data from respective first slice memories in unit of slice;
      a quantizer that quantizes the video data from the video encoder;
      a first macro block buffer that temporarily stores the video data from the quantizer in unit of macro block; and
      a quantization controller that controls the quantizer to adjust an amount of the video data from the quantizer that is to be stored in the first macro block buffer based on a monitored number of output bits of the first macro block buffer to the multiplexer/demultiplexer per macro block and based on a transmission channel rate of the multiplexer/demultiplexer, wherein the quantization controller monitors the number of output bits of the first macro block buffer per macro block and determines whether the number of the output bits per macro block are greater than a predetermined value or less than the predetermined value, wherein the predetermined value is based on the transmission channel rate of the multiplexer/demultiplexer, and wherein the quantization controller controls the quantizer to adjust the amount of video data by comparing the monitored number of output bits and an average number of transmission bits per macro block.

2. The video encoding/decoding apparatus of claim 1, wherein the image input device is a camera.

3. The video encoding/decoding apparatus of claim 1, wherein the encoding unit further comprises a first inverse quantizer that receives an output from the first macro block buffer and that provides an output to the video encoder.

4. The video encoding/decoding apparatus of claim 1, wherein the quantization controller controls the quantizer such that the number of output bits of the quantizer decreases per macro block when the number of output bits of the first macro block buffer per macro block is greater than the predetermined value.

5. The video encoding/decoding apparatus of claim 1, wherein the quantization controller controls the quantizer such that the number of the output bits of the quantizer per macro block increases when the number of output bits of the first macro block buffer per macro block is less than the predetermined value.

6. The video encoding/decoding apparatus of claim 1, wherein the quantization controller controls the quantizer so as to insert stuffing bits to the output bits of the first macro block buffer when the number of output bits of the first macro block buffer per macro block are very small.

7. The video encoding/decoding apparatus of claim 1, wherein the decoding unit comprises:
a second macro block buffer that temporarily stores the video data demultiplexed at the multiplexer/demultiplexer;
a second inverse quantizer that inversely quantizes video data from the second macro block buffer;
a video decoder that decodes the video data from the second inverse quantizer; and
a plurality of second slice memories that temporarily store the video data from the video decoder and transmits the video data to a display in unit of slice.

8. The video encoding/decoding apparatus of claim 1, wherein the average number of transmission bits is determined based on the transmission channel rate of the multiplexer/demultiplexer.

9. A video encoding/decoding method comprising:
processing video data inputted from an image input device in unit of slice;
transmitting the video data processed in unit of slice through a communication channel;
receiving video data through the communication channel; and
processing the received video data in unit of slice,
wherein processing the input video data comprises:
temporarily storing, in a buffer, encoded and quantized video data in unit of macro block,
monitoring, by a quantization controller, a number of bits of the stored video data outputted from the buffer in unit of macro block, and
controlling quantization to adjust an amount of video data stored in the buffer based on the monitored number of bits outputted from the buffer per macro block and based on a transmission channel rate of the communication channel, wherein controlling the quantization includes the quantization controller whether the monitored number of bits per macro block is greater than a predetermined value or less than the predetermined value, wherein the predetermined value is based on the transmission channel rate of the communication channel, and wherein controlling the quantization includes the quantization controller controlling a quantizer to adjust the amount of video data stored in the buffer by the quantization controller comparing the monitored number of bits and an average number of transmission bits per macro block.

10. The video encoding/decoding method of claim 9, wherein the image input device is a camera.

11. The video encoding/decoding method of claim 9, wherein processing the input video data further comprises:
temporarily storing the input video data in parallel in unit of slice;
encoding the video data stored in parallel in a predetermined order;
quantizing the encoded video data; and
multiplexing the temporarily stored quantized video data in unit of macro block together with audio and control signals.

12. The video encoding/decoding method of claim 11, wherein processing the input video data further comprises:
inversely quantizing the video data stored in unit of macro block; and
sending the inversely quantized video data to the video data encoding.

13. The video encoding/decoding method of claim 9, wherein controlling the quantization further includes:
decreasing quantization amount when the monitored number of bits of the video data stored in unit of macro block is greater than the predetermined value; and
increasing quantization amount when the monitored number of bits of the video data stored in unit of macro block is less than the predetermined value.

14. The video encoding/decoding method of claim 9, wherein controlling the quantization further includes inserting stuffing bits when the number of bits of the video data stored in unit of macro block is very small in comparison with the predetermined value.

15. The video encoding/decoding method of claim 9, wherein processing the received video data comprises:
demultiplexing the received video data;
temporarily storing the video data in unit of macro block;
inversely quantizing the video data stored in unit of macro block;
decoding the inversely quantized video data in unit of slice;
temporarily storing the decoded video data in parallel in unit of slice; and
transmitting the video data to a display in a predetermined order.

16. The video encoding/decoding method of claim 9, wherein the average number of transmission bits is determined based on the transmission channel rate.

17. A video encoding/decoding apparatus comprising:
an encoding unit to process video data to be transmitted in a unit of a slice;
a multiplexer/demultiplexer to multiplex the data from the encoding unit and to demultiplex video data received from a communication channel; and
a decoding unit to process video data from the multiplexer/demultiplexer in a unit of a slice,
wherein the encoding unit comprises:
a first plurality of slice memories to store the video data from an image input device in units of a slice,
a video encoder to encode the video data from respective first slice memories in units of a slice,
a quantizer to quantize the video data from the video encoder,
a first macro block buffer to store the video data from the quantizer in units of a macro block, and a quantization controller to control the quantizer and to adjust an amount of the video data from the quantizer to be stored in the first macro block buffer based on a monitored number of output bits of the first macro block buffer to the multiplexer/demultiplexer per macro block and based on an average number of transmission bits per macro block from the multiplexer/demultiplexer, wherein the quantization controller controls the quantizer such that the number of output bits of the quantizer decreases per macro block when the monitored number of output bits of the first macro block buffer per macro block is greater than a predetermined value determined based on the average number of transmission bits, and the quantization controller controls the quantizer such that the number of the output bits of the quantizer per macro block increases when the monitored number of output bits of the first macro block buffer per macro block is less than the predetermined value determined based on the average number of transmission bits.

18. The video encoding/decoding apparatus of claim 17, wherein the encoding unit further comprises a first inverse quantizer to receive an output from the first macro block buffer and to provide an output to the video encoder.

19. The video encoding/decoding apparatus of claim 17, wherein the quantization controller controls the quantizer by inserting stuffing bits to the output bits of the first macro block buffer when the monitored number of output bits of the first macro block buffer per macro block is small.

20. The video encoding/decoding apparatus of claim 17, wherein the decoding unit comprises:
- a second macro block buffer to store the video data demultiplexed at the multiplexer/demultiplexer;
- a second inverse quantizer to inversely quantize video data from the second macro block buffer;
- a video decoder to decode the video data from the second inverse quantizer; and
- a plurality of second slice memories to store the video data from the video decoder and to transmit the video data to a display in a unit of a slice.

* * * * *